Patented Nov. 15, 1949

2,488,499

UNITED STATES PATENT OFFICE 2,488,499

1,4-DI(HALOPHENOXY)-2-BUTENES

Clarence L. Moyle, Clare, Mich., assignor to The Dow Chemical Company, Midland, Mich., a corporation of Delaware No Drawing. Application September 13, 1948, Serial No. 49,133

4 Claims. (Cl. 260—613)

This invention is directed to the 1,4-di(halophenoxy)-2-butenes having the formula

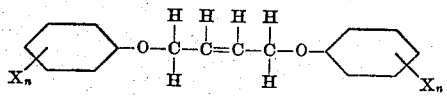

wherein X represents chlorine or bromine and $n$ is an integer from 1 to 5. These compounds are crystalline solids or oils somewhat soluble in many organic solvents, substantially insoluble in water, not appreciably affected by carbon dioxide and non-corrosive to the skin of man and higher animals. They are valuable as constituents of parasiticidal compositions and as modifying agents in plastic compositions.

One method of preparing the new compounds consists of reacting an alkali metal halophenolate with 1,4-dibromo-2-butene having the formula

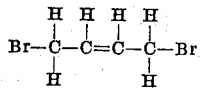

1 molecular proportion of 1,4-dibromo-2-butene is reacted with 2 molecular proportions of the halophenolate, somewhat better yields being obtained when a small excess of the halophenolate is employed. The reaction may be carried out in an inert organic solvent and in the presence of a small amount of water, if desired. The reaction is slightly exothermic and has been found to take place at temperatures between 30° and 100° C. In practice, it is frequently convenient to operate at the boiling temperature of the reaction mixture and under reflux.

In a representative preparation, 2 mols of sodium hydroxide and 2 mols of a halophenol are mixed together in ethyl alcohol to form an alcoholic phenolate solution. 1 mol of 1,4-dibromo-2-butene is added portionwise to the above solution and the resulting mixture warmed for a short time at a temperature of from 40° to 80° C. to complete the reaction. The crude reaction product is then successively washed with dilute aqueous sodium hydroxide and water, and dried over silica gel to obtain as a residue the desired 1,4-di(halophenoxy)-2-butene. The latter may be further purified, if desired, by extraction with a suitable organic solvent, additional washing, recrystallization or other conventional manipulation.

1,4-dibromo-2-butene employed as a starting material, as above described, is readily prepared by dissolving 1,3-butadiene in ethylene dichloride and reacting this solution with bromine at low temperatures. The desired product of reaction is obtained from the crude reaction mixture by conventional methods of purification, such as fractional distillation and fractional crystallization, and has a melting point of 53° C.

The following examples illustrate the invention and are not to be construed as limiting.

*Example 1.—1,4-di(4-chlorophenoxy)-2-butene*

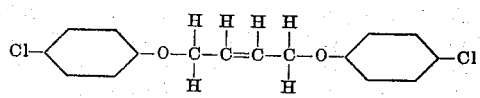

16.8 grams (0.42 mol) of sodium hydroxide was reacted with 53.9 grams (0.42 mol) of 4-chlorophenol in 78.9 grams of isopropyl alcohol to form an alcoholic solution of the sodium salt of the phenol. 42.8 grams (0.2 mol) of 1,4-dibromo-2-butene was added portionwise to the alcoholic phenolate, the mixture then warmed at the boiling temperature and under reflux for 30 minutes to complete the reaction and thereafter cooled to room temperature. The crude reaction product was successively washed with dilute aqueous sodium hydroxide and water and the resulting mixture filtered. The residue from the filtering operation was then dried over silica gel to obtain 1,4-di(4-chlorophenoxy)-2-butene as a crystalline solid melting at 121° to 122° C.

*Example 2*

16.0 grams (0.4 mol) of sodium hydroxide and 51.4 grams (0.4 mol) of 2-chlorophenol were reacted in a mixture of 39.9 grams of methyl alcohol and 12 grams of water. 42.8 grams (0.2 mol) of 1,4-dibromo-2-butene was added portionwise to the above solution and the resulting mixture thereafter warmed for 30 minutes at 50° to 60° C. to complete the reaction. The crude product was dispersed in methylene dichloride and the resultant mixture successively washed with dilute aqueous sodium hydroxide and water, and dried. The solvent was then removed by evaporation to obtain as a residue, 1,4-di(2-chlorophenoxy)-2-butene. This compound was a brown oil having a density of 1.26 at 25° C.

*Example 3*

3.2 grams (0.08 mol) of sodium hydroxide and 13.8 grams (0.08 mol) of 2-bromophenol were mixed together in 24 grams of methyl alcohol and 3 grams of water. 8.6 grams (0.04 mol) of 1,4-dibromo-2-butene was added to the above alcoholic phenolate solution and the mixture thereafter warmed at the boiling temperature for 15 minutes to complete the reaction. The reaction mixture was then dispersed in dilute aqueous sodium hydroxide, the organic products of reaction extracted with methylene dichloride and the extract washed with water and dried. The solvent was removed by evaporation to obtain 1,4-di(2-bromophenoxy)-2-butene as a crystalline solid melting at 111° C.

*Example 4*

16.8 grams (0.42 mol) of sodium hydroxide and 83 grams (0.42 mol) of 2,4,5-trichlorophenol were reacted in 240 grams of a mixture of 24 parts by weight of methyl alcohol to 1 part of water. 42.8 grams (0.2 mol) of 1,4-dibromo-2-butene was added portionwise to the above solution and this mixture warmed at the boiling temperature and under reflux for 30 minutes to complete the reaction. The crude product was then dispersed in dilute aqueous sodium hydroxide and the resulting mixture filtered. The residue was washed with water and dried to obtain 1,4-di(2,4,5-trichlorophenoxy)-2-butene as a crystalline solid. This product was recrystallized from toluene and found to have a melting point of 171° C.

*Example 5*

4.0 grams (0.1 mol) of sodium hydroxide and 26.65 grams (0.1 mol) of pentachlorophenol were reacted in 78.9 grams of ethyl alcohol and 2 grams of water. 10.7 grams (0.05 mol) of 1,4-dibromo-2-butene was added to the above solution and the mixture thereafter warmed for a short time at 50° to 60° C. to complete the reaction. The crude reaction product was then filtered and the residue successively washed with dilute alcoholic sodium hydroxide, water, dilute aqueous hydrochloric acid and water. This residue was air dried to obtain 1,4-di(pentachlorophenoxy)-2-butene as a crystalline solid melting at 221° to 223° C.

In a similar manner other 1,4-di(halophenoxy)-2-butenes may be prepared, of which the following are representative:

1,4-di(2,3,4,6-tetrachlorophenoxy)-2-butene by reacting sodium 2,3,4,6-tetrachlorophenolate with 1,4-dibromo-2-butene.

1,4-di(4-bromophenoxy)-2-butene by reacting sodium 4-bromophenolate with 1,4-dibromo-2-butene.

1,4-di(2,4,6-tribromophenoxy)-2-butene by reacting sodium 2,4,6-tribromophenolate with 1,4-dibromo-2-butene.

1,4-di(2,4-dichlorophenoxy)-2-butene by reacting sodium 2,4-dichlorophenolate with 1,4-dibromo-2-butene.

The parasiticidal activity of the new compounds is illustrated by the miticidal and aphicidal toxicity of 1,4-di(4-chlorophenoxy)-2-butene. The composition employed consisted of a mixture of 25 parts by weight of 1,4-di(4-chlorophenoxy)-2-butene, 65 parts of xylene and 10 parts of the dioctyl ester of sulfosuccinic acid (a commercial wetting and emulsifying agent known as Aerosol OT). This composition was dispersed in water to form aqueous sprays containing various amounts of the toxicant. When employed for the control of two-spotted spider mite, a 90 per cent kill was obtained at a toxicant concentration of 0.5 pound per 100 gallons. When employed for the control of bean aphids, a 100 per cent kill was obtained at a toxicant concentration of 1 pound per 100 gallons.

I claim:

1. A 1,4-di(halophenoxy)-2-butene having the formula

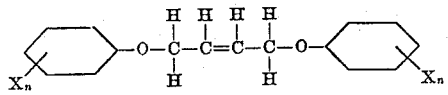

wherein X represents a member of the group consisting of chlorine and bromine and $n$ is an integer from 1 to 5, inclusive.

2. 1,4-di(2-chlorophenoxy)-2-butene.
3. 1,4-di(2,4,5-trichlorophenoxy)-2-butene.
4. 1,4-di(pentachlorophenoxy)-2-butene.

CLARENCE L. MOYLE.

No references cited.